(12) United States Patent
Lee et al.

(10) Patent No.: US 11,219,088 B2
(45) Date of Patent: Jan. 4, 2022

(54) METHOD AND APPARATUS FOR CONFIGURING RELEASE CAUSE

(71) Applicant: LG ELECTRONICS INC., Seoul (KR)

(72) Inventors: Youngdae Lee, Seoul (KR); Hyunjung Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 16/633,150

(22) PCT Filed: Sep. 28, 2018

(86) PCT No.: PCT/KR2018/011519
§ 371 (c)(1),
(2) Date: Jan. 22, 2020

(87) PCT Pub. No.: WO2019/066546
PCT Pub. Date: Apr. 4, 2019

(65) Prior Publication Data
US 2020/0205220 A1      Jun. 25, 2020

Related U.S. Application Data

(60) Provisional application No. 62/564,269, filed on Sep. 28, 2017.

(51) Int. Cl.
*H04W 76/19*     (2018.01)
*H04W 76/38*     (2018.01)

(52) U.S. Cl.
CPC ........... *H04W 76/38* (2018.02); *H04W 76/19* (2018.02)

(58) Field of Classification Search
CPC .................................................... H04W 76/38
See application file for complete search history.

(56) References Cited

U.S. PATENT DOCUMENTS

| | | | | |
|---|---|---|---|---|
| 9,807,661 | B1* | 10/2017 | Manepalli | H04W 52/0258 |
| 10,499,452 | B2* | 12/2019 | Kim | H04W 76/28 |
| 10,736,171 | B2* | 8/2020 | Lee | H04W 52/0216 |
| 2005/0063304 | A1* | 3/2005 | Sillasto | H04W 76/38 370/229 |
| 2009/0116378 | A1* | 5/2009 | Jen | H04L 41/0668 370/216 |
| 2012/0122405 | A1* | 5/2012 | Gerber | H04W 52/0232 455/67.11 |

(Continued)

OTHER PUBLICATIONS

PCT International Application No. PCT/KR2018/011519, International Search Report dated Jan. 9, 2019, 9 pages.

(Continued)

*Primary Examiner* — Parth Patel
(74) *Attorney, Agent, or Firm* — Lee Hong Degerman Kang Waimey

(57) ABSTRACT

Provided is a method for configuring a release cause by a user equipment (UE) in a wireless communication system. The method may include: receiving a configuration of inactivity timer, from a base station (BS); when the data inactivity timer is expired, configuring the release cause for leaving connected state, wherein the configured release cause prevents the UE from initiating a random access procedure.

11 Claims, 11 Drawing Sheets

(56) References Cited

U.S. PATENT DOCUMENTS

| | | | |
|---|---|---|---|
| 2013/0039287 A1* | 2/2013 | Rayavarapu | H04W 72/042 370/329 |
| 2013/0171986 A1* | 7/2013 | Shimizu | H04W 76/19 455/423 |
| 2013/0195049 A1* | 8/2013 | Yang | H04W 72/04 370/329 |
| 2013/0310057 A1* | 11/2013 | Tabet | H04W 76/25 455/450 |
| 2014/0003348 A1* | 1/2014 | Velev | H04W 60/06 370/328 |
| 2014/0169323 A1* | 6/2014 | Park | H04W 72/042 370/329 |
| 2014/0269637 A1* | 9/2014 | Banister | H04W 76/27 370/336 |
| 2014/0321435 A1* | 10/2014 | Pradas | H04W 28/0278 370/336 |
| 2015/0043490 A1* | 2/2015 | Wu | H04W 74/0833 370/329 |
| 2015/0078335 A1* | 3/2015 | Sivanesan | H04W 36/0058 370/331 |
| 2015/0223284 A1* | 8/2015 | Jain | H04B 17/318 370/329 |
| 2016/0100362 A1* | 4/2016 | Palanisamy | H04W 52/0229 370/311 |
| 2016/0135247 A1* | 5/2016 | Ozturk | H04W 36/0016 455/436 |
| 2017/0188278 A1* | 6/2017 | Ohta | H04W 36/04 |
| 2017/0245213 A1* | 8/2017 | Martinez Tarradell | H04L 5/0048 |
| 2018/0070402 A1* | 3/2018 | Chinthalapudi | H04L 65/1016 |
| 2018/0124619 A1* | 5/2018 | Xu | H04W 24/08 |
| 2018/0124864 A1* | 5/2018 | Lee | H04W 52/0216 |
| 2019/0053324 A1* | 2/2019 | Tseng | H04W 76/30 |
| 2019/0166647 A1* | 5/2019 | Velev | H04L 5/0098 |
| 2019/0191483 A1* | 6/2019 | Ryoo | H04W 76/27 |
| 2019/0327650 A1* | 10/2019 | Yiu | H04J 11/0069 |
| 2020/0037179 A1* | 1/2020 | Dalsgaard | H04W 72/048 |
| 2020/0092785 A1* | 3/2020 | Yang | H04W 76/19 |
| 2020/0100161 A1* | 3/2020 | Awada | H04W 36/00835 |
| 2020/0187291 A1* | 6/2020 | Sha | H04W 52/02 |
| 2020/0205193 A1* | 6/2020 | Amuru | H04W 16/28 |
| 2020/0205220 A1* | 6/2020 | Lee | H04W 76/18 |
| 2020/0314667 A1* | 10/2020 | Fujishiro | H04W 64/00 |
| 2020/0374960 A1* | 11/2020 | Deenoo | H04W 72/14 |
| 2021/0250857 A1* | 8/2021 | Palanisamy | H04W 72/042 |

OTHER PUBLICATIONS

Lte Advanced Pro, 3GPP; TSG-RAN; E-UTRA; RRC; Protocol specification (Release 14), 3GPP TS 36.331 V14.3.0 (Jun. 2017), 3 pages.

* cited by examiner

METHOD AND APPARATUS FOR CONFIGURING RELEASE CAUSE

CROSS-REFERENCE TO RELATED APPLICATIONS

This application is the National Stage filing under 35 U.S.C. 371 of International Application No. PCT/KR2018/011519, filed on Sep. 28, 2018, which claims the benefit of U.S. Provisional Application No. 62/564,269, filed on Sep. 28, 2017, the contents of which are all hereby incorporated by reference herein in their entirety.

BACKGROUND OF THE DISCLOSURE

Field of the Disclosure

The present invention relates to a wireless communication system, and more particularly, to a method for a user equipment (UE) to configure a release cause and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

Data inactivity timer may be used to control data inactivity operation. Upon expiry of the data inactivity timer, the UE performs actions upon leaving RRC_CONNECTED.

Meanwhile, according to the prior art, upon receiving release cause 'RRC connection failure', the UE NAS layer initiate the tracking area update procedure to recover NAS signaling connection. Considering the intention of the data inactivity timer, however, the UE shall not perform the NAS signaling recovery mechanism. Specifically, in terms of power consumption saving, if the UE does not receive data until the data inactivity timer is expired, the UE should perform state transition to an idle state and the UE NAS does not need to perform NAS recovery procedure (e.g. tracking area update procedure). Thus, a method for preventing the UE from NAS signaling recovery mechanism upon expiration of the data inactivity timer and an apparatus supporting the same need to be suggested.

SUMMARY OF THE DISCLOSURE

One embodiment provides a method for configuring a release cause by a user equipment (UE) in a wireless communication system. The method may include: receiving a configuration of inactivity timer, from a base station (BS); and when the data inactivity timer is expired, configuring the release cause for leaving connected state, wherein the configured release cause prevents the UE from initiating a random access procedure.

Another embodiment provides a method for configuring a release cause by a base station (BS) in a wireless communication system. The method may include: transmitting a configuration of inactivity timer, to a user equipment (UE), wherein a release cause for leaving connected state is configured by the UE when the inactivity timer is expired, and wherein the configured release cause prevents the UE from initiating random access procedure.

Another embodiment provides a user equipment (UE) configuring a release cause in a wireless communication system. The UE may include: a memory; a transceiver; and a processor connected with the memory and the transceiver, and configured to: control the transceiver to receive a configuration of inactivity timer, from a base station (BS); and when the data inactivity timer is expired, configure the release cause for leaving connected state, wherein the configured release cause prevents the UE from initiating a random access procedure.

When the data inactivity timer expires, it is possible to prevent the UE from performing unnecessary RACH procedures or recovery procedures.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
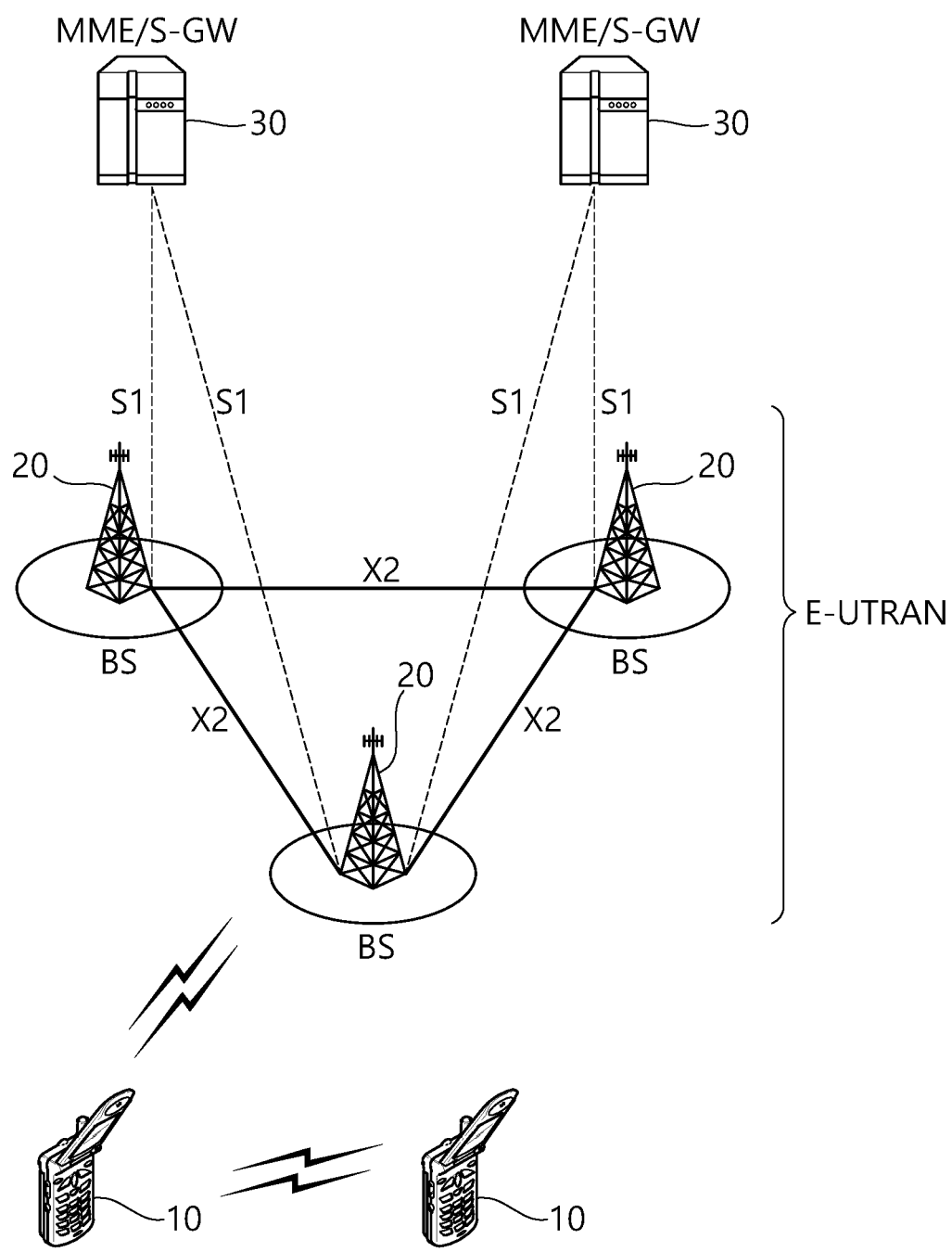
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an end-point. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
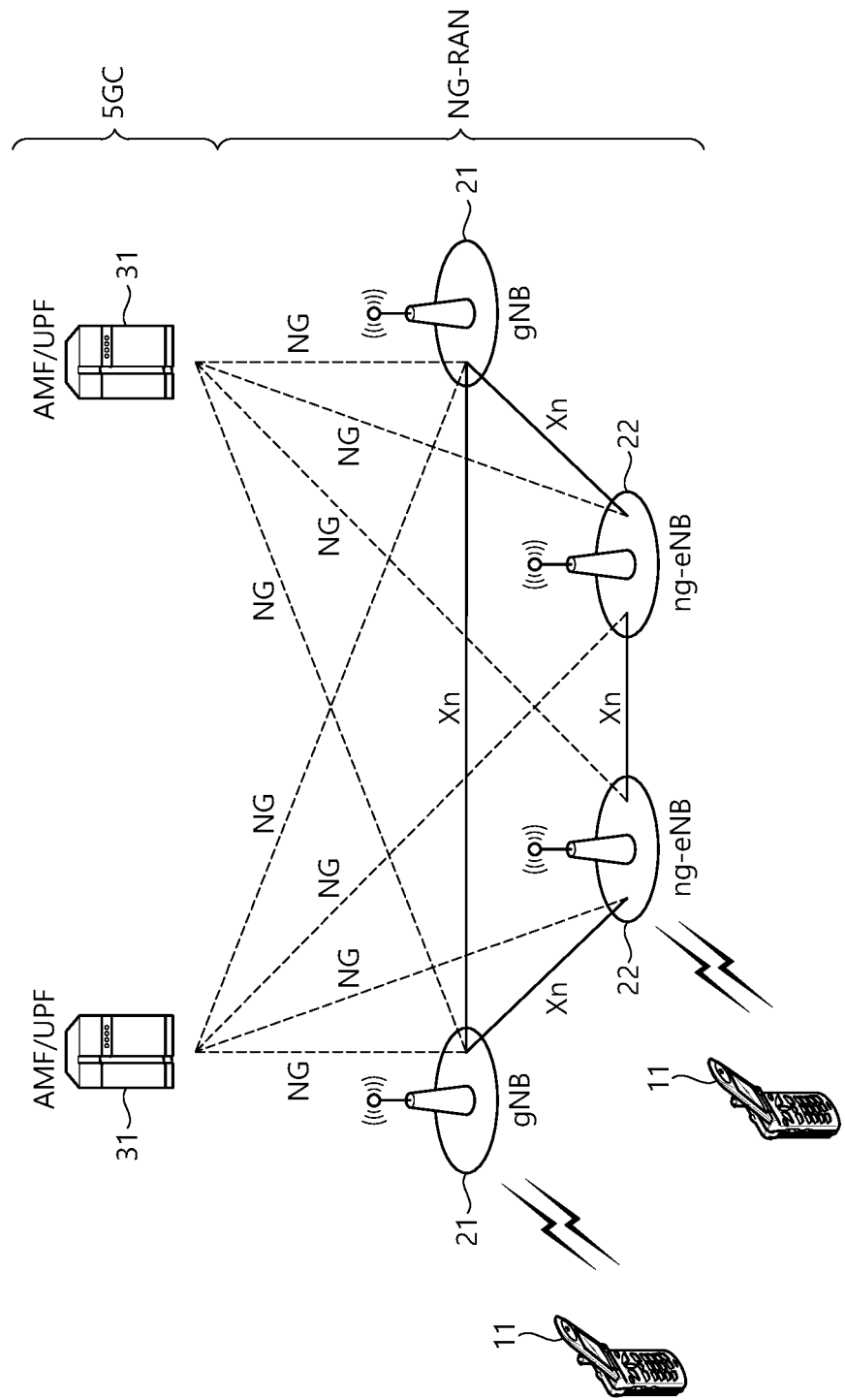
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
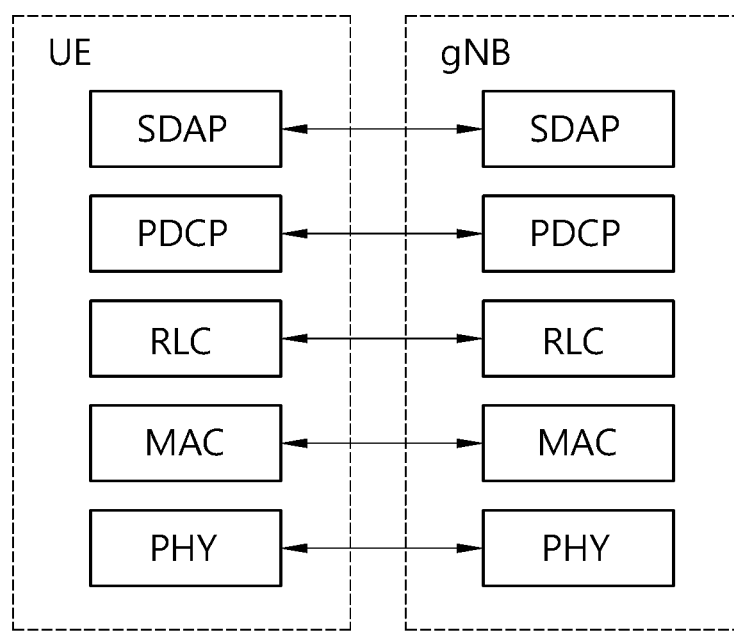
FIG. 3 shows a block diagram of a user plane protocol stack to which technical features of the present invention may be applied.
Figure 4:
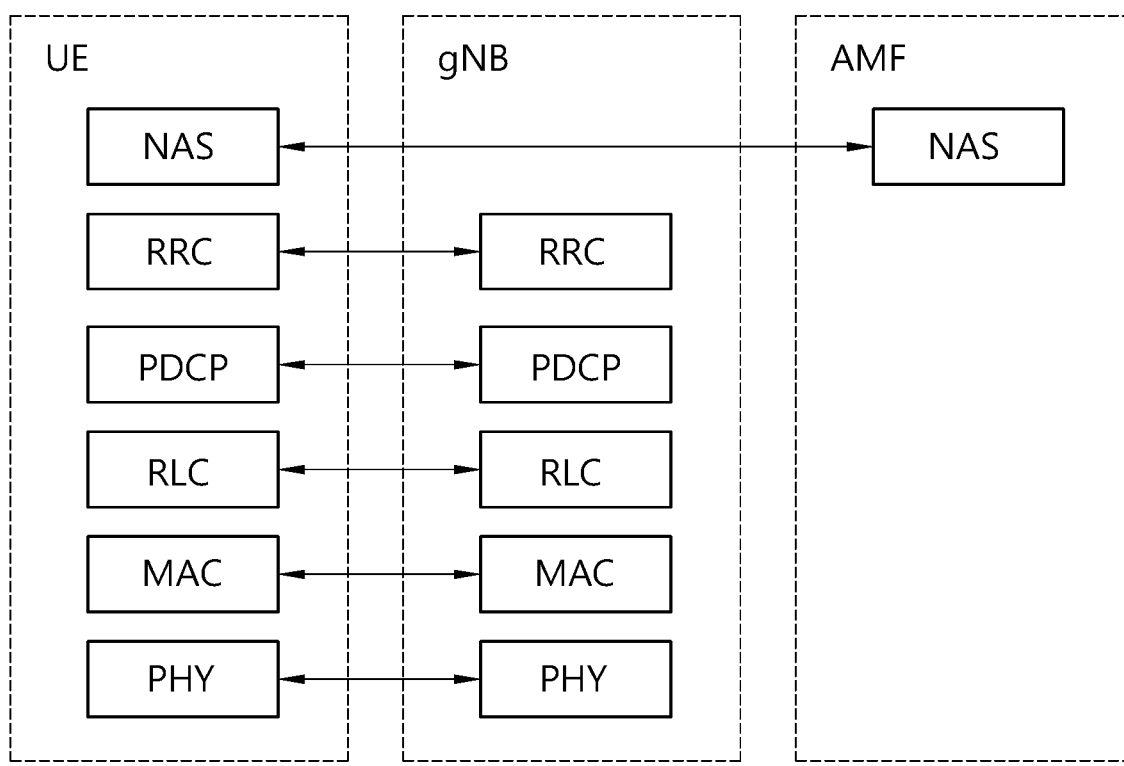
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
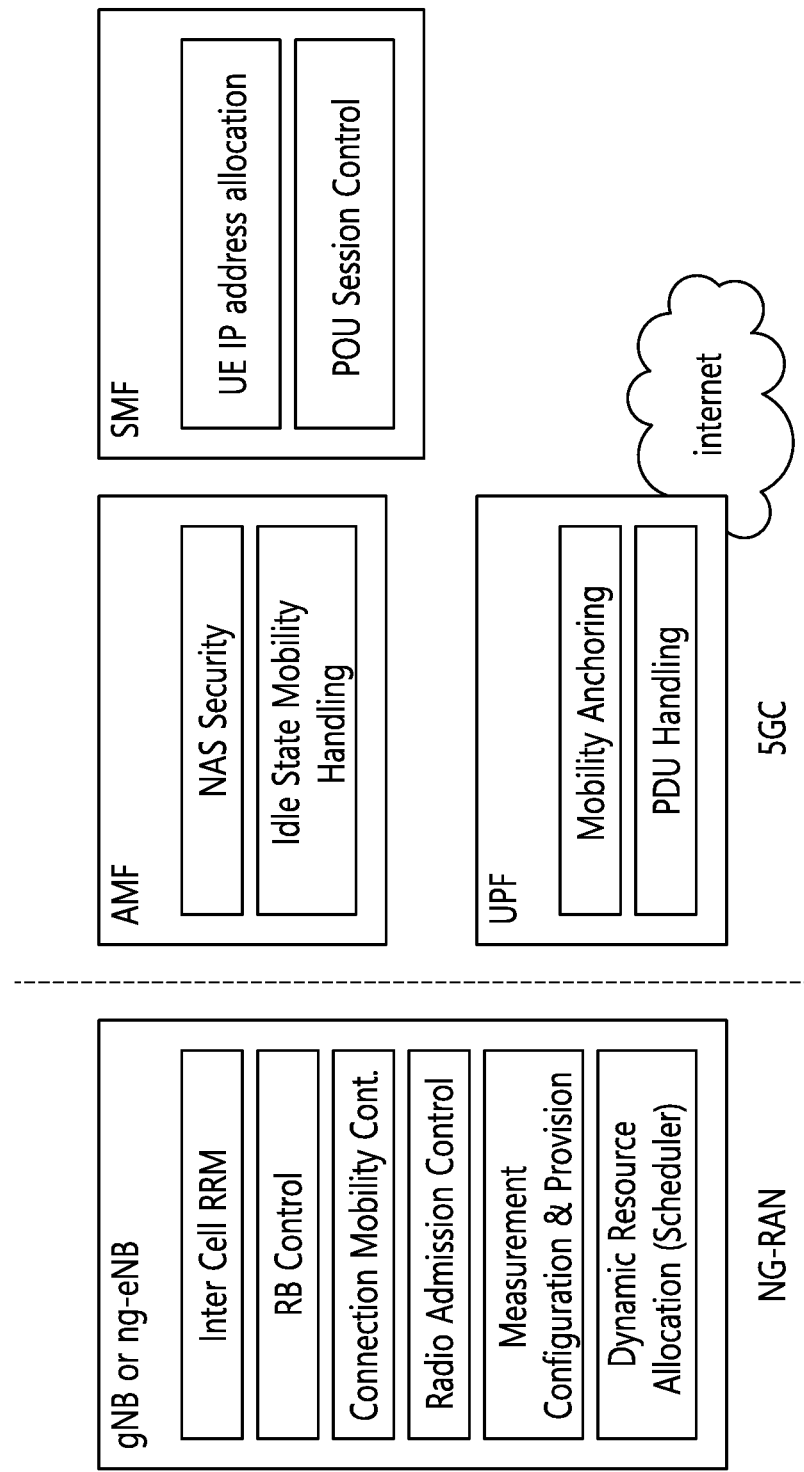
FIG. 5 shows functional split between NG-RAN and 5GC to which technical features of the present invention may be applied.

FIG. 5 shows functional split between NG-RAN and 5GC to which technical features of the present invention may be applied.

Referring to FIG. 5, the gNB and ng-eNB may host the following functions:
- Functions for Radio Resource Management: Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or O&M);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) may host the following main functions:
- NAS signalling termination;
- NAS signalling security;
- AS Security control;
- Inter CN node signalling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- SMF selection.

The User Plane Function (UPF) may host the following main functions:
- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g. packet filtering, gating, UL/DL rate enforcement;
- Uplink Traffic verification (SDF to QoS flow mapping);
- Downlink packet buffering and downlink data notification triggering.

The Session Management function (SMF) may host the following main functions:
- Session Management;
- UE IP address allocation and management;
- Selection and control of UP function;
- Configures traffic steering at UPF to route traffic to proper destination;
- Control part of policy enforcement and QoS;
- Downlink Data Notification.

Hereinafter, access stratum (AS) operation related to data inactivity timer is described.

Data inactivity timer may be used to control data inactivity operation. Upon expiry of the data inactivity timer, the UE (e.g. UE RRC) may perform actions upon leaving RRC_CONNECTED, with release cause 'RRC connection failure'. The UE actions upon leaving RRC_CONNECTED is described in section 5.3.12 of 3GPP TS 36.331 V14.3.0. For instance, upon expiry of the data inactivity timer, the UE may leave RRC_CONNECTED and enter RRC_IDLE.

The data inactivity timer may be defined as shown in Table 1. For example, value s1 corresponds to 1 second, s2 corresponds to 2 seconds and so on.

TABLE 1

-- ASN1START
DataInactivityTimer-r14 ::= ENUMERATED {s1, s2, s3, s5, s7, s10, s15, s20, s40, s50, s60, s80, s100, s120, s150, s180}
-- ASN1STOP A UE MAC may be configured by a UE RRC with a data inactivity monitoring functionality, when in RRC_CONNECTED. The UE RRC may control data inactivity operation by configuring the data inactivity timer. When data inactivity timer is configured, the UE (e.g. UE MAC) may start or restart data inactivity timer, if the UE receives the MAC service data unit (SDU) for DTCH logical channel, DCCH logical channel, or CCCH logical channel. Or, the UE (e.g. UE MAC) may start or restart data inactivity timer, if the UE transmits the MAC SDU for DTCH logical channel, or DCCH logical channel. If the data inactivity timer expires, the UE (e.g. UE MAC) may indicate the expiry of the data inactivity timer to upper layers (e.g. UE RRC).

Hereinafter, non-access stratum (NAS) operation related to data inactivity timer is described.

As described above, upon expiry of the data inactivity timer, the UE (e.g. UE RRC) may perform actions upon leaving RRC_CONNECTED, with release cause 'RRC connection failure'. When the UE receives an indication of 'RRC connection failure' from a lower layers (e.g. UE RRC) and has no signaling or user uplink data pending (i.e when the lower layer requests NAS signaling connection recovery), the UE in state EMM-REGISTERED shall initiate the tracking area updating procedure by sending a tracking area update request message to the core network (e.g. MME). When the UE receives an indication of 'RRC connection failure' from a lower layers (e.g. UE RRC) and has no signaling or user uplink data pending (i.e when the lower layer requests NAS signaling connection recovery), the UE operating in CS/PS mode 1 or CS/PS mode 2, in state EMM-REGISTERED, shall initiate the combined tracking area updating procedure.

Meanwhile, the data inactivity timer operation has been used to solve the RRC state mismatch issue. When the data inactivity timer expires, the UE (e.g. UE RRC) may transit to the RRC_IDLE state and indicate the RRC connection release event to the upper layer (e.g. UE NAS) with the release cause 'RRC connection failure'. According to prior art, however, when the UE NAS receives this cause 'RRC connection failure', the UE NAS should perform the NAS signaling recovery mechanism which triggers the tracking area update procedure to restore the NAS signaling connection. Then, the UE attempts the RRC connection again to transmit the signaling to the network. That is, the UE attempts the RRC connection establishment procedure for NAS recovery right after the UE transits to RRC_IDLE when the data inactivity timer is expired. As the intention of the data inactivity timer is for the UE to leave RRC_CONNECTED state, however, the UE operation mismatches with the intention of adding the data inactivity timer. Thus, a method for preventing the UE from initiating a random access procedure upon expiration of the data inactivity timer and an apparatus supporting the same need to be suggested.

Figure 6:
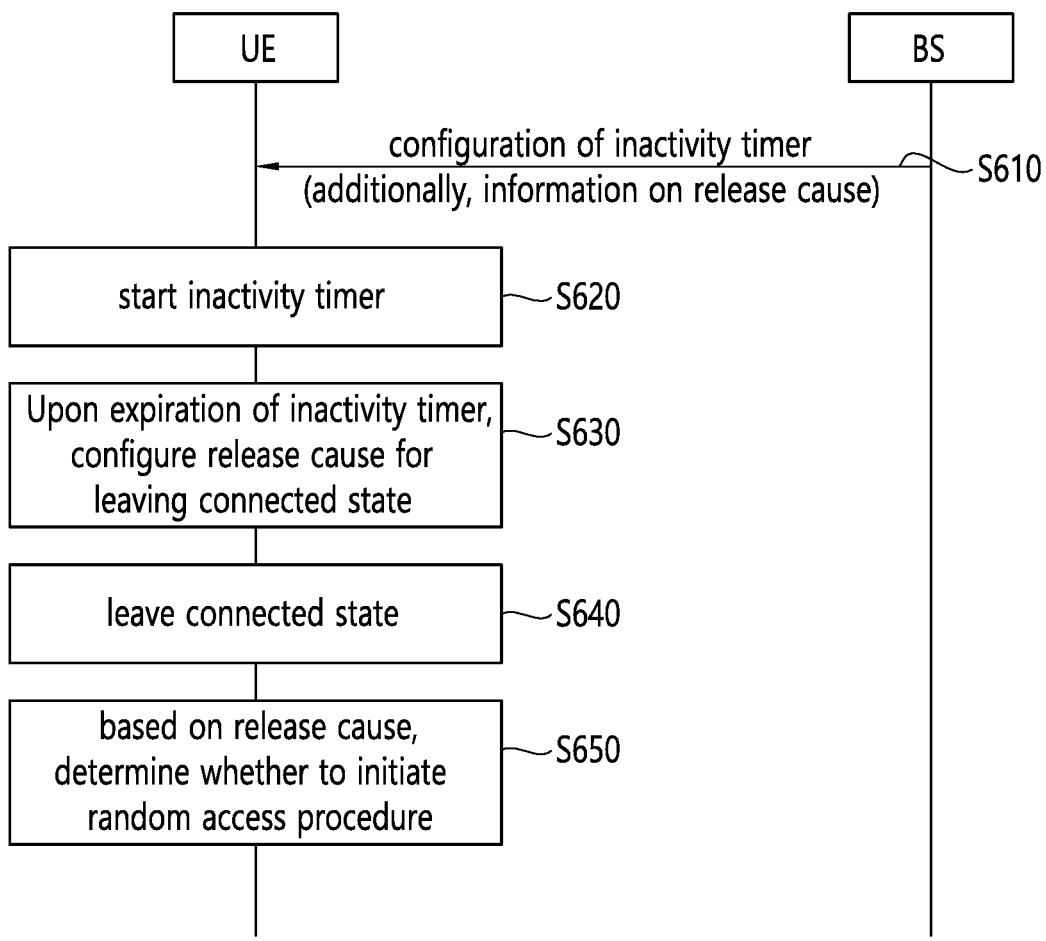
FIG. 6 shows a procedure for preventing the UE from initiating a random access procedure according to an embodiment of the present invention.

FIG. 6 shows a procedure for preventing the UE from initiating a random access procedure according to an embodiment of the present invention.

Referring to FIG. 6, in step S610, the UE may receive a configuration of inactivity timer (e.g. data inactivity timer). Further, the UE may receive information on release cause. For instance, the information on release cause may be an indication indicating a release cause to be used.

In step S620, the UE may start or re-start the inactivity timer.

In step S630, the UE may set release cause upon expiration of the inactivity timer. When the inactivity timer is expired, the release cause may be set according to following options.

Option 1 (release cause is set by the UE autonomously)

The UE set release cause for leaving connected state when a UE RRC leaves RRC_CONNECTED due to expiration of the inactivity timer. For instance, the release cause may be set by a UE RRC, then the UE RRC may inform a UE NAS of the release cause for leaving connected state. The release cause for leaving connected state may be a release cause set to 'other'.

Option 2 (release cause is set based on information on release cause received from base station)

The base station informs the UE of the information on release cause. For instance, the base station may indicate to the UE which release cause should be used (e.g. either 'RRC connection failure' or 'other'). For instance, the information on release cause may be informed to the UE via a message (e.g. RRC connection reconfiguration message). The information on release cause may be informed to the UE when the base station configures the inactivity timer in the message.

In case of option 1, upon receiving release cause set to 'other', the UE (e.g. UE NAS) may be not required for any action. Therefore, the UE does not trigger NAS recovery due to the RRC connection release event with the release cause set to 'other'. In case of Option 2, the UE may follow the network instruction that is the general operation when the RRC connection is released.

In step S640, the UE may leave connected state.

In step S650, the UE may determine whether or not to initiate the random access procedure based on the set release cause, e.g. for state transition to RRC_CONNECTED, RRC connection establishment, or RRC connection resume. For instance, if the set release cause is for leaving connected state (e.g. 'other'), the UE may not initiate the random access procedure. On the other hand, if the set release cause is not for leaving connected state (e.g. 'RRC connection failure'), the UE may initiate the random access procedure.

Figure 7:
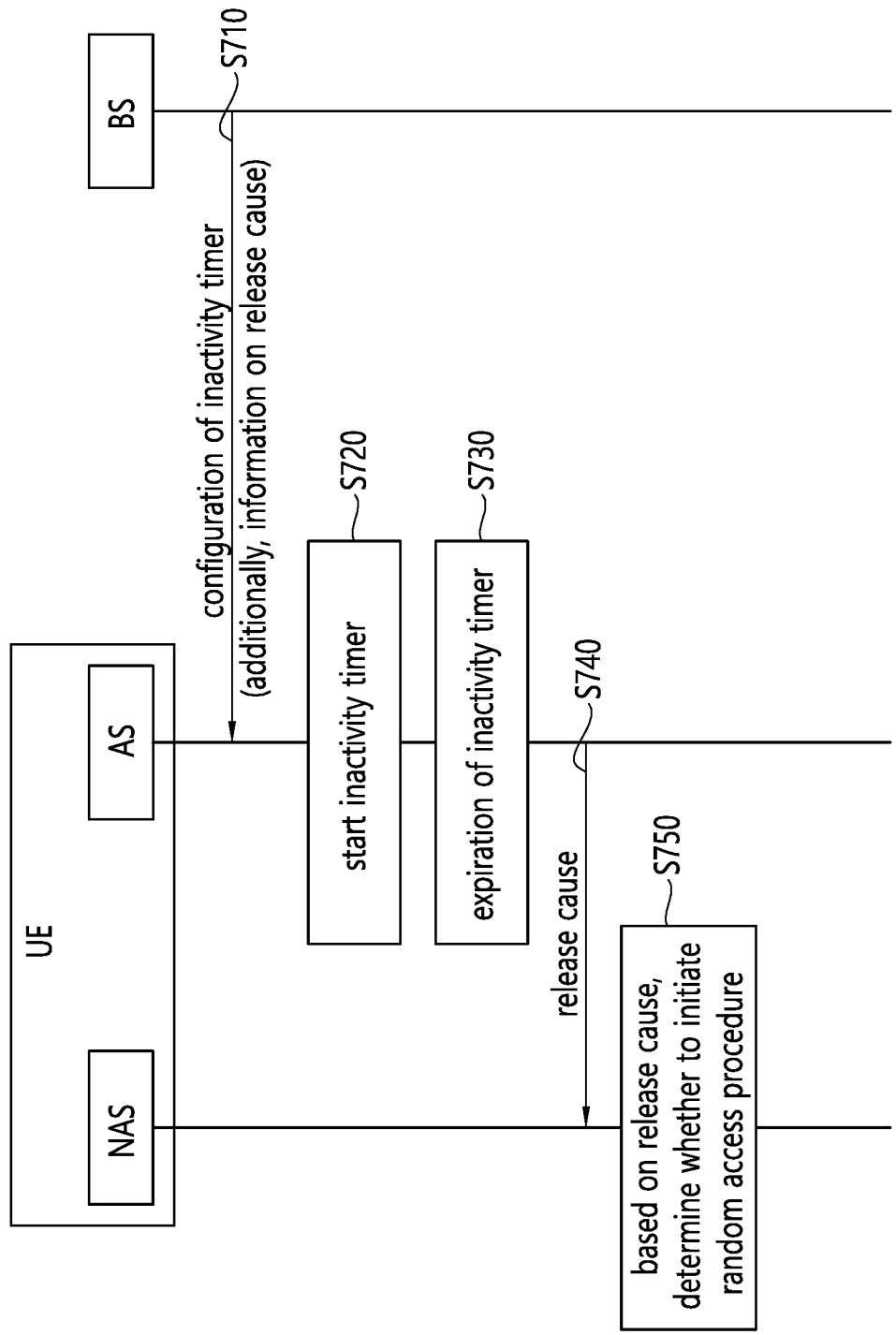
FIG. 7 shows a procedure for preventing the UE from initiating a random access procedure according to an embodiment of the present invention.

FIG. 7 shows a procedure for preventing the UE from initiating a random access procedure according to an embodiment of the present invention.

Referring to FIG. 7, in step S710, a base station may transmit a configuration of inactivity timer (e.g. data inactivity timer) to the UE. Additionally, the base station may indicate to the UE which release cause should be used (e.g. either 'RRC connection failure' or 'other') via a message, when the base station configures the inactivity timer in the message. For instance, the message may be a RRC connection reconfiguration message.

In step S720, upon receiving the configuration of the inactivity timer from the base station, a UE AS (e.g. UE MAC) may start or re-start the inactivity timer. Alternatively, upon receiving the configuration of the inactivity timer and the information about which release cause should be used from the base station, the UE MAC may start or re-start the inactivity timer.

In step S730, if the inactivity timer is expired, the UE MAC may inform a UE RRC about expiration of the inactivity timer.

In step S740, when the UE RRC receives the expiration of the inactivity timer from the UE MAC, the UE RRC may set release cause as follows.

If the base station configures the release cause to the UE in step S710, the UE RRC may set the release cause as what the base station configured.

If the base station does not configure the release cause to the UE in step S710, the UE RRC layer may set the release cause to 'other'. Alternatively, if the base station does not configure the release cause to the UE in step S710, the UE RRC layer may set the release cause to 'RRC connection failure'.

Then, the UE RRC may send the set release cause to a UE NAS. That is, the UE RRC may indicate the RRC connection release event to the UE NAS layer with the set release cause. Desirably, in case that the UE wants to leave connected state, the UE RRC may set the release cause to 'other'.

In step S750, depending on the release cause received from the UE RRC, the UE NAS operates as follows.

- If the release cause is equal to 'RRC connection failure', the UE NAS may initiate a tracking area update procedure. For instance, when the UE RRC receives the NAS signaling transmission request, the UE RRC may attempt a RRC connection establishment. In the RRC connection establishment, the UE may trigger a random access procedure.
- If the release cause is equal to 'other', no action may be required for the UE NAS. For instance, if the release cause is equal to 'other', the UE may not trigger the random access procedure.

According to the prior art, upon receiving release cause 'RRC connection failure', the UE NAS layer initiate the tracking area update procedure to recover NAS signaling connection. Considering the intention of the inactivity timer, however, the UE shall not perform the NAS signaling recovery mechanism. Specifically, in terms of power consumption saving, if the UE does not receive data until the data inactivity timer is expired, the UE should perform state transition to an idle state and the UE NAS does not need to perform NAS recovery procedure (e.g. tracking area update procedure).

Thus, according to an embodiment of the present invention, even if the inactivity timer is expired, the UE does not trigger the random access procedure by setting the release cause. For instance, by setting the release cause to 'other', an unnecessary NAS recovery procedure may not be initiated. Therefore, the power consumption of the UE can be reduced according to an embodiment of the present invention.

Figure 8:
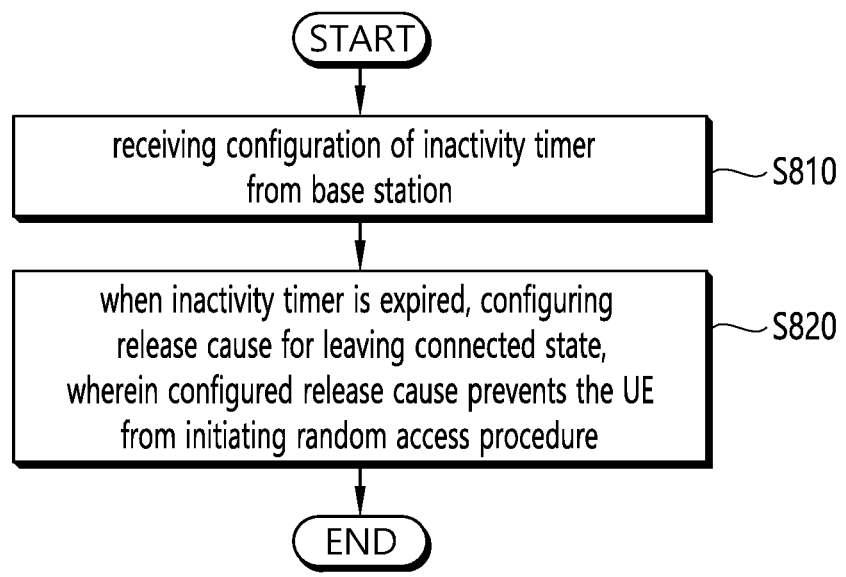
FIG. 8 shows a method for configuring a release cause by a UE according to an embodiment of the present invention.

FIG. 8 shows a method for configuring a release cause by a UE according to an embodiment of the present invention. The present invention described above for UE side may be applied to this embodiment.

Referring to FIG. 8, in step S810, the UE may receive a configuration of inactivity timer, from a base station (BS).

In step S820, when the data inactivity timer is expired, the UE may configure the release cause for leaving connected state, wherein the configured release cause prevents the UE from initiating a random access procedure. The random access procedure may be related to fast recovery. The random access procedure may be initiated immediately after leaving connected state. The release cause for leaving connected state may be transferred from a radio resource control (RRC) layer of the UE to a non-access stratum (NAS) layer of the UE.

The release cause may be configured by the UE autonomously.

Further, the UE may receive information on release cause to be used, from the BS. In this case, the release cause may be configured based on the received information on release cause to be used.

The data inactivity timer may be expired before the UE detects a RLF failure. The RLF failure may occur due to expiration of a RLF timer, expiration of a beam failure timer, and/or re-establishment failure.

Alternatively, the data inactivity timer may be expired after the UE detects a RLF failure. When the data inactivity timer is expired after the UE detects a RLF failure, the UE may configure the release cause for initiating the random access procedure, then the UE may initiate the random access procedure.

Figure 9:
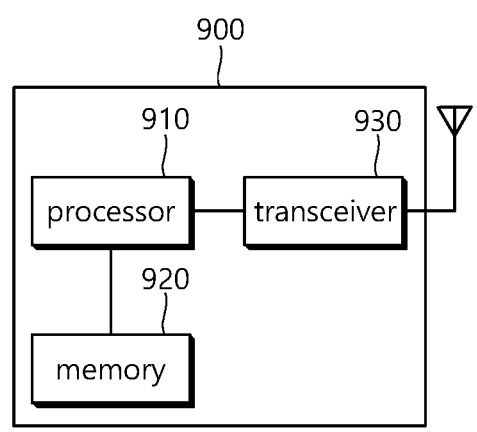
FIG. 9 shows a UE to implement an embodiment of the present invention.

FIG. 9 shows a UE to implement an embodiment of the present invention. The present invention described above for UE side may be applied to this embodiment.

A UE 900 includes a processor 910, a memory 920 and a transceiver 930. The processor 910 may be configured to implement proposed functions, procedures and/or methods described in this description. Layers of the radio interface protocol may be implemented in the processor 910.

Specifically, the processor 910 may control the transceiver 930 to receive a configuration of inactivity timer, from a base station (BS).

When the data inactivity timer is expired, the processor 910 may configure the release cause for leaving connected state, wherein the configured release cause prevents the UE from initiating a random access procedure. The random access procedure may be related to fast recovery. The random access procedure may be initiated immediately after leaving connected state. The release cause for leaving connected state may be transferred from a radio resource control (RRC) layer of the UE to a non-access stratum (NAS) layer of the UE.

The release cause may be configured by the UE autonomously.

Further, the processor 910 may receive information on release cause to be used, from the BS. In this case, the release cause may be configured based on the received information on release cause to be used.

The data inactivity timer may be expired before the UE detects a RLF failure. The RLF failure may occur due to expiration of a RLF timer, expiration of a beam failure timer, and/or re-establishment failure.

Alternatively, the data inactivity timer may be expired after the UE detects a RLF failure. When the data inactivity timer is expired after the UE detects a RLF failure, the processor 910 may configure the release cause for initiating the random access procedure, then the processor 910 may initiate the random access procedure.

The memory 920 is operatively coupled with the processor 910 and stores a variety of information to operate the processor 910. The transceiver 920 is operatively coupled with the processor 910, and transmits and/or receives a radio signal.

Figure 10:
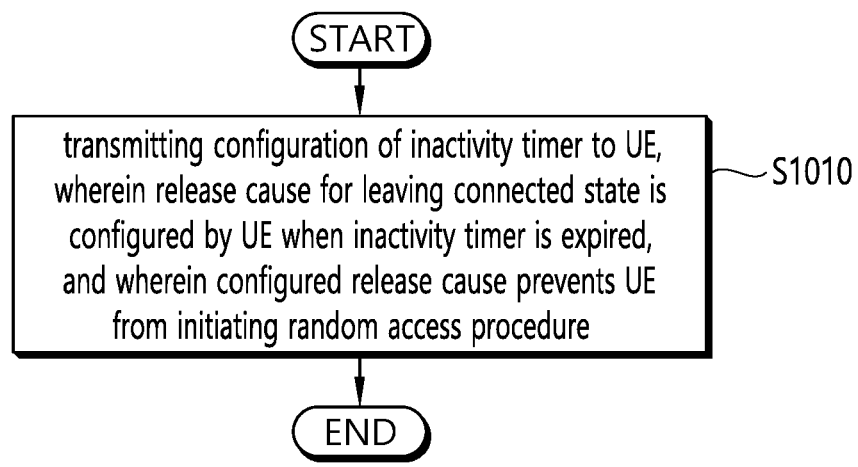
FIG. 10 shows a method for configuring a release cause by a BS according to an embodiment of the present invention.

FIG. 10 shows a method for configuring a release cause by a BS according to an embodiment of the present invention. The present invention described above for BS side may be applied to this embodiment.

Referring to FIG. 10, in step S1010, the BS may transmit a configuration of inactivity timer, to a user equipment (UE), wherein a release cause for leaving connected state is configured by the UE when the inactivity timer is expired, and the configured release cause prevents the UE from initiating random access procedure.

Further, the BS may transmit information on release cause to be used, to the UE. The release cause may be configured based on the transmitted information on release cause to be used. Alternatively, the release cause may be configured by the UE autonomously.

The random access procedure may be related to fast recovery. The random access procedure may be initiated immediately after leaving connected state. The release cause for leaving connected state may be transferred from a radio resource control (RRC) layer of the UE to a non-access stratum (NAS) layer of the UE.

Figure 11:
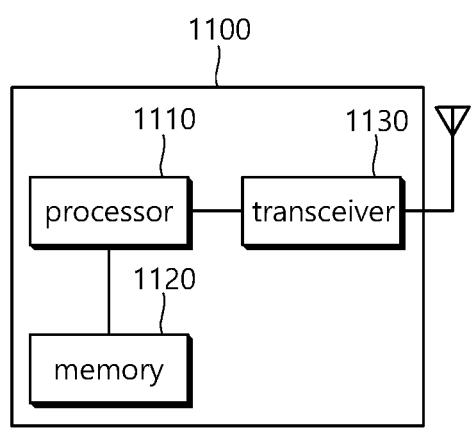
FIG. 11 shows a BS to implement an embodiment of the present invention.

FIG. 11 shows a BS to implement an embodiment of the present invention. The present invention described above for BS side may be applied to this embodiment.

A BS 1100 includes a processor 1110, a memory 1120 and a transceiver 1130. The processor 1110 may be configured to implement proposed functions, procedures and/or methods described in this description. Layers of the radio interface protocol may be implemented in the processor 1110.

Specifically, the processor 1110 may control the transceiver 1130 to transmit a configuration of inactivity timer, to a user equipment (UE), wherein a release cause for leaving connected state is configured by the UE when the inactivity timer is expired, and the configured release cause prevents the UE from initiating random access procedure.

Further, the processor 1110 may control the transceiver 1130 to transmit information on release cause to be used, to the UE. The release cause may be configured based on the transmitted information on release cause to be used. Alternatively, the release cause may be configured by the UE autonomously.

The random access procedure may be related to fast recovery. The random access procedure may be initiated immediately after leaving connected state. The release cause for leaving connected state may be transferred from a radio resource control (RRC) layer of the UE to a non-access stratum (NAS) layer of the UE.

The memory 1120 is operatively coupled with the processor 1110 and stores a variety of information to operate the processor 1110. The transceiver 1130 is operatively coupled with the processor 1110, and transmits and/or receives a radio signal.

The processor 910, 1110 may include an application-specific integrated circuit (ASIC), a separate chipset, a logic circuit, and/or a data processing unit. The memory 920, 1120 may include a read-only memory (ROM), a random access memory (RAM), a flash memory, a memory card, a storage medium, and/or other equivalent storage devices. The transceiver 930, 1130 may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor 910, 1110. The memory 920, 1120 may be located inside or outside the processor 910, 1110, and may be coupled to the processor 910, 1110 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for configuring a release cause by a user equipment (UE) in a wireless communication system, the method comprising:

receiving, from a base station (BS), (i) a configuration of data inactivity timer and (ii) information regarding the release cause related to expiration of the data inactivity timer, wherein the information regarding the release cause represents either radio resource control (RRC) connection failure or other;

starting the data inactivity timer based on the configuration of the data inactivity timer; and based on the data inactivity timer being expired, configuring the release cause for leaving connected state based on the information regarding the release cause received from the BS, wherein, based on the information regarding the release cause representing the other, the release cause is configured by the UE to the other, and the release cause configured to the other prevents the UE from initiating a random access procedure, and wherein, based on the information regarding the release cause representing the RRC connection failure, the release cause is configured by the UE to the RRC connection failure, and the random access procedure of the UE is initiated by the release cause configured to the RRC connection failure.

2. The method of claim 1, wherein the random access procedure is related to fast recovery.

3. The method of claim 1, wherein the random access procedure is initiated immediately after leaving connected state.

4. The method of claim 1, wherein the release cause for leaving connected state is transferred from a RRC layer of the UE to a non-access stratum (NAS) layer of the UE.

5. The method of claim 1, wherein the release cause is configured by the UE autonomously.

6. The method of claim 1, wherein the data inactivity timer is expired before the UE detects a RLF failure.

7. The method of claim 6, wherein the RLF failure occurs due to expiration of a RLF timer, expiration of a beam failure timer, and/or re-establishment failure.

8. The method of claim 1, wherein the data inactivity timer is expired after the UE detects a RLF failure.

9. The method of claim 8, further comprising:

based on the data inactivity timer expiring after the UE detects a RLF failure, configuring the release cause for initiating the random access procedure, and initiating the random access procedure.

10. A user equipment (UE) configuring a release cause in a wireless communication system, the UE comprising:

a memory; a transceiver; and a processor connected with the memory and the transceiver, and configured to:

control the transceiver to receive, from a base station (BS), (i) a configuration of data inactivity timer and (ii) information regarding the release cause related to expiration of the data inactivity timer, wherein the information regarding the release cause represents either radio resource control (RRC) connection failure or other;

start the data inactivity timer based on the configuration of the data inactivity timer; and based on the data inactivity timer being expired, configure the release cause for leaving connected state based on the information regarding the release cause received from the BS, wherein, based on the information regarding the release cause representing the other, the release cause is configured by the UE to the other, and the release cause configured to the other prevents the UE from initiating a random access procedure, and wherein, based on the information regarding the release cause representing the RRC connection failure, the release cause is configured by the UE to the RRC connection failure, and the random access procedure of the UE is initiated by the release cause configured to the RRC connection failure.

11. The method of claim 1, wherein the UE communicates with at least one of a mobile terminal, a network or autonomous vehicles other than the UE.

* * * * *